(12) United States Patent
Aoki

(10) Patent No.: US 6,978,634 B2
(45) Date of Patent: Dec. 27, 2005

(54) SEPARATELY AIR-CONDITIONABLE VEHICLE AIR CONDITIONING APPARATUS

(75) Inventor: Shinji Aoki, Chiryu (JP)

(73) Assignee: DENSO Corporation, Kariya (JP)

( * ) Notice: Subject to any disclaimer, the term of this patent is extended or adjusted under 35 U.S.C. 154(b) by 34 days.

(21) Appl. No.: 10/730,399

(22) Filed: Dec. 8, 2003

(65) Prior Publication Data

US 2004/0112076 A1   Jun. 17, 2004

(30) Foreign Application Priority Data

Dec. 9, 2002   (JP)   ................ 2002-356561

(51) Int. Cl.[7] ........................... B60H 1/32
(52) U.S. Cl. .............. 62/244; 165/42; 165/205; 454/164
(58) Field of Search .................. 62/244; 165/203, 165/205, 207, 42, 43; 454/151, 164

(56) References Cited

U.S. PATENT DOCUMENTS

| | | | | |
|---|---|---|---|---|
| 1,780,903 A | * | 11/1930 | Berman | ..................... 454/151 |
| 2,764,078 A | * | 9/1956 | Tell | ............................ 454/151 |
| 3,391,628 A | * | 7/1968 | Ziegenfelder | ............... 454/164 |
| 4,800,951 A | * | 1/1989 | Sakurai | ...................... 165/203 |
| 4,873,837 A | * | 10/1989 | Murray | ........................ 62/199 |
| 4,881,456 A | * | 11/1989 | Yasuda et al. | ................ 454/75 |
| 5,261,855 A | * | 11/1993 | Law et al. | ..................... 454/76 |
| 5,588,909 A | * | 12/1996 | Ferng | .......................... 454/141 |
| 6,266,967 B1 | * | 7/2001 | Honda | .......................... 62/193 |
| 6,598,665 B2 | * | 7/2003 | Schwarz | ...................... 165/42 |

FOREIGN PATENT DOCUMENTS

JP   8-58354   3/1996

* cited by examiner

*Primary Examiner*—William E. Tapolcai
(74) *Attorney, Agent, or Firm*—Harness, Dickey & Pierce, PLC

(57) ABSTRACT

A vehicle air conditioning apparatus has discharging openings, each of which is disposed near a corresponding one of passenger seats. Accordingly, air discharged from air outlets does not flow so as to concentrate on one discharging opening and instead flows toward the respective discharging openings. Therefore, the air blown from the air outlets is prevented from being mixed, thereby being capable of separately controlling the temperatures of the compartments on the respective passenger seats.

5 Claims, 4 Drawing Sheets

AIR CONDITIONING ON

INSIDE OF VEHICLE

OUTSIDE OF VEHICLE

AIR CONDITIONING OFF

INSIDE OF VEHICLE

OUTSIDE OF VEHICLE

AIR CONDITIONING ON

INSIDE OF VEHICLE

OUTSIDE OF VEHICLE

SEPARATELY AIR-CONDITIONABLE VEHICLE AIR CONDITIONING APPARATUS

CROSS REFERENNCE TO RELATED APPLICATION

This application is based on Japanese Patent Application No. 2002-356561 filed on Dec. 9, 2002, the disclosure of which is incorporated herein by reference.

FIELD OF THE INVENTION

The present invention relates to a vehicle air conditioning apparatus.

BACKGROUND OF THE INVENTION

In a conventional vehicle air conditioning apparatus, air is ventilated by discharging air in a passenger compartment from a discharging outlet, e.g., disposed at a rear package tray behind a rear seat. Accordingly, even though air outlets for drawing conditioned air are provided for respective seats so as to respectively control temperature of compartments on passenger seats, the air discharged into the passenger compartment in a manner that concentrates on the discharging outlet. Therefore, conditioned air blown from respective drawing outlets is mixed, thereby being hard to separately control the respective compartments on the passenger seats.

SUMMARY OF THE INVENTION

In view of above circumstances, the purpose of the present invention is to provide a vehicle air conditioning apparatus that can separately control compartments over respective seats.

According to the present invention, a vehicle air conditioning apparatus comprises a plurality of passenger seats, at least one air conditioning unit for controlling temperature of air blown into a passenger compartment, and a plurality of discharging openings, through which air is discharged into outside of the vehicle. The vehicle air conditioning apparatus characterized in that an exit of each discharging opening on the side of the passenger compartment is disposed near the corresponding one of the passenger seats.

Accordingly, air discharged from air outlets does not flow so as to concentrate on a single discharging opening and instead flows so as to flow toward the respective discharging openings. Therefore, the conditioned air blown from the respective air outlets is prevented from being mixed, thereby being capable of separately controlling the temperatures of the compartments on the respective passenger seats.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS (First Embodiment)

Figure 1:
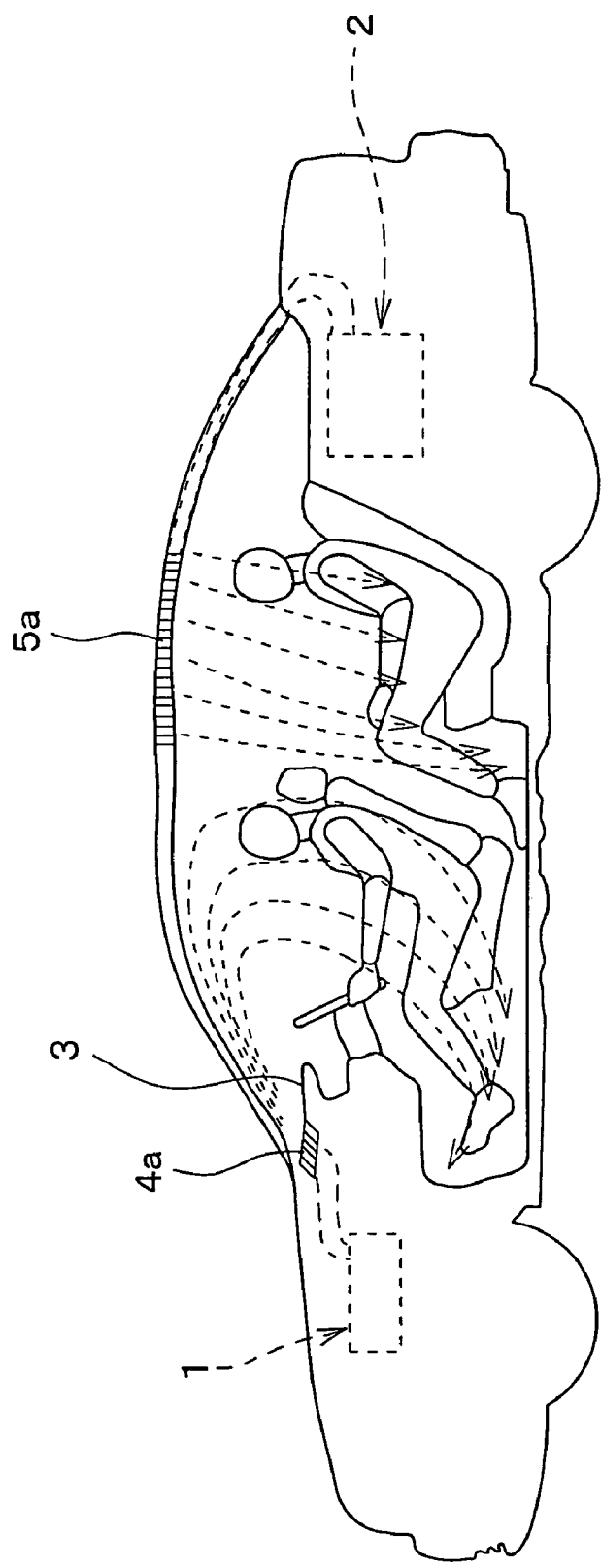
FIG. 1 is a schematic diagram of a vehicle air conditioning apparatus according to a first embodiment of the present invention.

Referring to FIG. 1, a front air conditioning unit 1 is disposed at a front part of a vehicle, specifically, in front of an instrument panel 3, thereby controlling temperature of air blowing toward a front part of the passenger compartment. A rear air conditioning unit 2 is disposed at a rear part of a passenger compartment, specifically, inside a trunk room, thereby controlling temperature of air blowing toward a rear part of the passenger compartment.

Each of the air conditioning units 1, 2 has an evaporator (not shown), a heater (not shown), an air mix door (not shown), a blowing mode switching door (not shown) and etc. The evaporator cools air blowing toward a blower (not shown) or the passenger compartment. The heater heats the air blowing toward the passenger compartment. The air mix door controls mixing amounts of cooled air and heated air, thereby controlling the temperature of the blowing air. The blowing mode switching door switches air outlets from which the air blow.

Moreover, the evaporator is a low pressure side heat exchanger of a vapor compression type refrigerating machine, which can refrigerate by evaporating low pressure refrigerant. In this embodiment, a compressor and a condenser for a front air conditioning unit are respectively shared with a compressor and a condenser for a rear air conditioning unit, and air to be blown toward the passenger compartment is heated by circulating coolant used for an engine in the heater.

Figure 2:
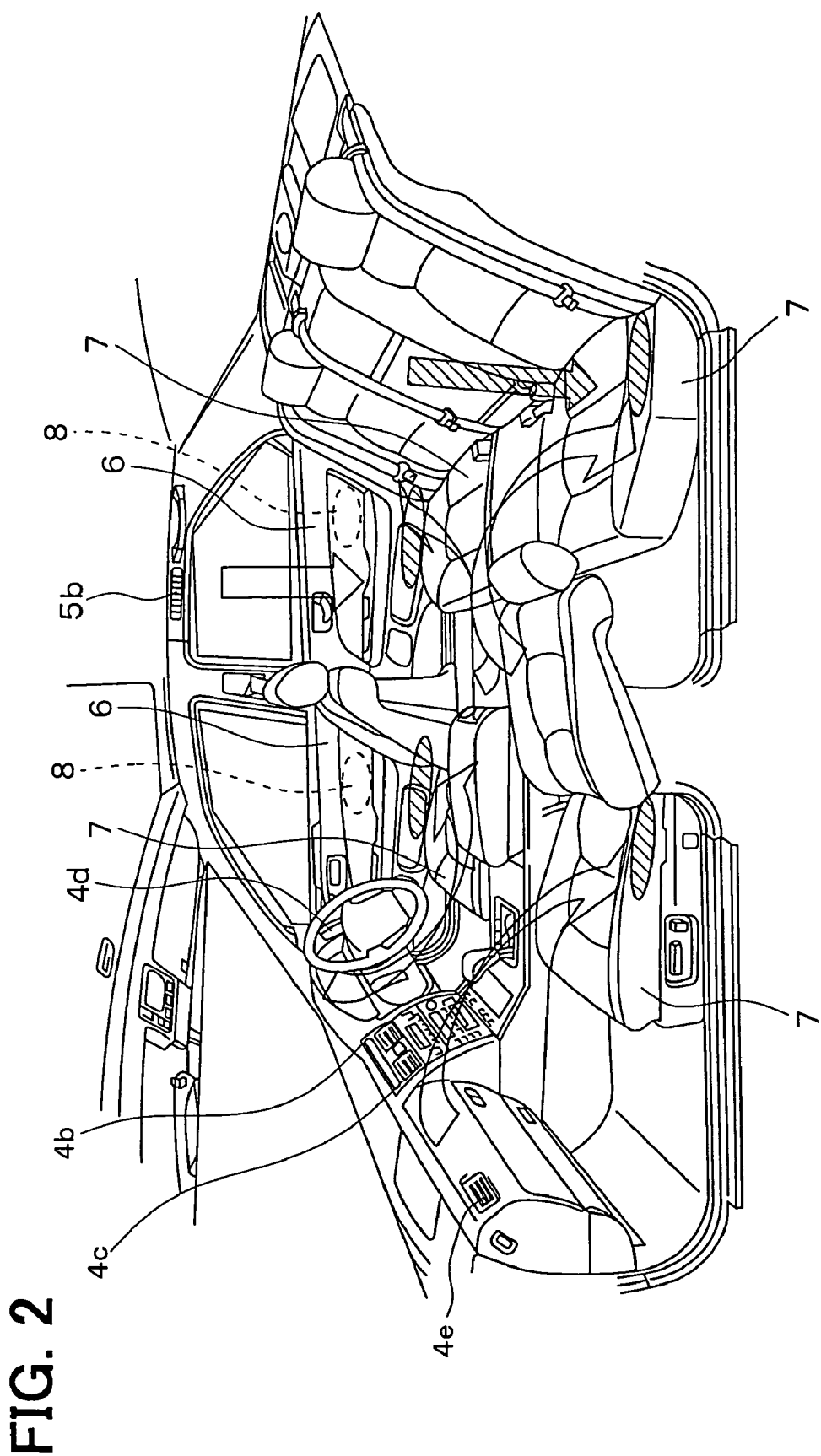
FIG. 2 is a perspective view of a passenger compartment provided with the vehicle air conditioning apparatus.

As shown in FIGS. 1 and 2, as air outlets for air supplied from the front air conditioning unit 1, a diffusion air outlet 4a, face air outlets 4b, 4c, side face air outlets 4d, 4e, a foot air outlet (not shown), a defroster air outlet (not shown) and etc. are provided. Through the diffusion air outlet 4a, air is blown from the substantially whole upper surface of an instrument panel 3. The face air outlets 4b, 4c are disposed in the substantial center of the instrument panel 3, and air is blown toward the half upper body of a passenger sitting on a front passenger seat through the face air outlets 4b, 4c. The side face air outlets 4d, 4e are disposed at both end portions of the instrument panel 3, and air is blown toward the half upper body of a passenger through the side face air outlets 4d, 4e. Through the foot air outlet, air is blown toward a foot of a passenger sitting on a front passenger seat. From the defroster air outlet, air is blown toward a wind shield.

Moreover, as shown in FIGS. 1 and 2, as air outlets for air supplied from the rear air conditioning unit 2, a roof air outlet 5a, a rear roof air outlet 5b and etc. are provided. Through the roof air outlet 5a, air is diffusely blown toward a passenger. Through the rear roof air outlet 5b, air is blown from a part of a roof positioned over a rear passenger door 6 toward a passenger sitting on the rear seat. Further, to the roof air outlet 5a and the rear roof air outlet 5b, air is supplied through a duct (not shown) installed inside a pillar.

Further, as shown in FIG. 2, at least one discharging opening 8 is provided at a position near each passenger seat 7, and air inside the passenger compartment is exhausted therethrough. More specifically, the position is a part of the passenger door 6 that is the nearest from the corresponding passenger seat 7 and corresponds to the hip position of a passenger in his or her sitting position.

Each discharging opening 8 is communicated with the passenger compartment through micro air vent holes formed on the surface of the passenger door 6 that is the passenger compartment side (designed surface). Therefore, the passenger cannot directly look at the discharging opening 8. To put it another way, each discharging opening 8 is positioned inside the passenger door 6.

Accordingly, while an air outlet and an air inlet of the discharging opening 8 are connected by a duct, the air outlet opening may be disposed to be misaligned the hip position of the passenger sitting on the seat.

Figure 3A:
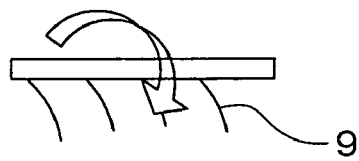
FIGS. 3A and 3B are illustrative diagrams of a non-return valve according to the first embodiment of the present invention.
Figure 3B:
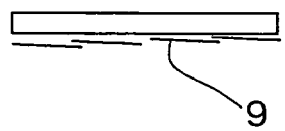
Figure 5:
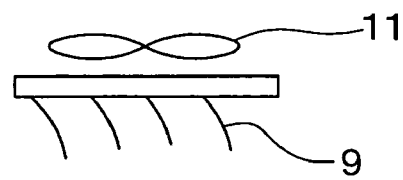
FIG. 5 is an illustrative diagram showing a discharging outlet and circumference thereof according to a third embodiment of the present invention.

Moreover, as shown in FIGS. 3A and 3B, the discharging opening 8 is provided with a non-return valve 9 having a shape like a reed valve. The non-return valve 9 is made of an elastic material, such as a rubber, thereby preventing air outside the passenger compartment from flowing into the passenger compartment through the discharging opening 8.

Hereinafter, the effect according to this embodiment will be described.

In this embodiment, the discharging openings 8 are respectively provided with near the passenger seats 7. Therefore, air blown from the air outlets does not flow so as to concentrate on a single discharging opening and instead flows toward the respective discharging openings 8.

Accordingly, the conditioned air blown from the respective air outlets is prevented from being mixed, thereby being capable of separately controlling the temperatures of the compartments on the respective passenger seats 7.

Heretofore, the temperatures of compartments on respective passenger seats can be separately controlled within 3 degree centigrade difference at most. However, in this embodiment, the temperatures of compartments on the respective passenger seats 7 can be separately controlled within 10 degree centigrade difference.

Moreover, each discharging opening 8 is disposed so as to correspond to the hip position of the passenger sitting on the corresponding passenger seat 7, thereby being capable of separately maintaining air flow condition for the respective passenger seats 7. Therefore, the air blown from the respective air outlets is prevented from being mixed, thereby being capable of separately controlling the temperatures of the conditioned air of the compartments on the respective passenger seats 7.

Further, the discharging opening 8 is provided with the non-return valve 9, thereby preventing air conditioning from being disturbed by the outside.

(Second Embodiment)

Figure 4:
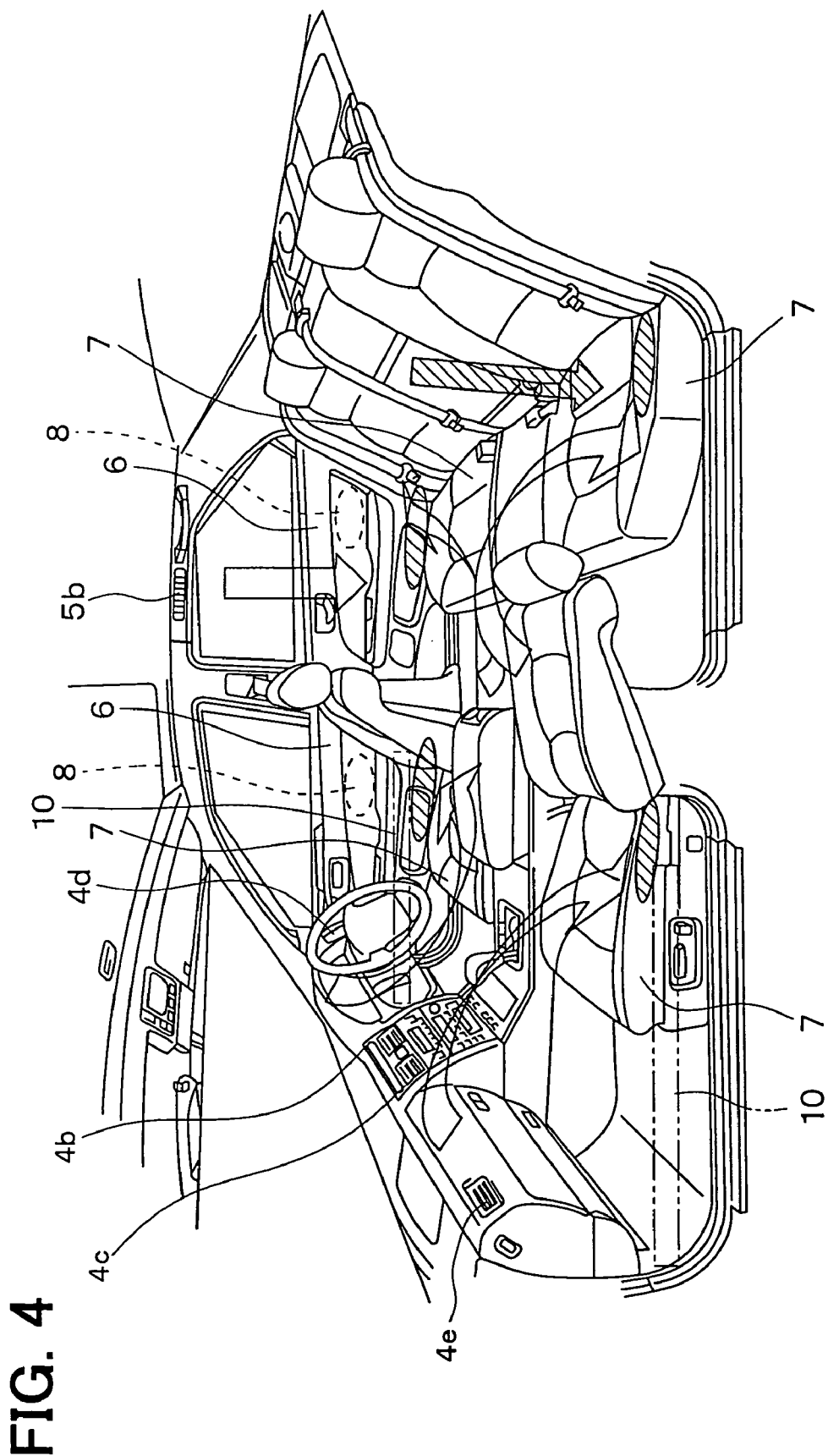
FIG. 4 is a perspective view of a passenger compartment provided with a vehicle air conditioning apparatus according to a second embodiment of the present invention.

In this embodiment, as shown in FIG. 4, ducts 10 are provided. The ducts 10 return inside air, drawn to the discharging openings 8, into the air conditioning units 1, 2.

Accordingly, while an inside circulating mode, in which the air inside the passenger compartment is circulated, is performed, outside air can be partially drawn with respect to each passenger seat 7.

Moreover, it is preferable that the duct 10 is formed with a resinous cylindrical member or a three dimensional net, which is perforated and has a three dimensional structure.

(Third Embodiment)

In this embodiment, each discharging opening 8 is provided with an air blower 11 for discharging air from the discharging opening 8.

(Other Embodiment)

In the above described embodiments, the discharging opening 8 is provided with the passenger door 6. However, the present invention is not limited to this. For example, the discharging opening 8 may be disposed at a lower part of the passenger compartment, such as a part under the passenger seat.

The present invention should not be limited to the embodiments previously discussed and shown in the figures, but may be implemented in various ways without departing from the spirit of the invention.

What is claimed is:

1. A vehicle air conditioning apparatus for a vehicle including a passenger compartment, the vehicle air conditioning apparatus comprising:
   a plurality of passenger seats;
   at least one air conditioning unit for controlling temperature of air blown into the passenger compartment; and
   a plurality of discharging openings, through which air is discharged outside of the passenger compartment of the vehicle, wherein an exit of each discharging opening on a side of the passenger compartment is disposed near a corresponding one of the passenger seats; wherein
   the at least one air conditioning unit comprises a front air conditioning unit, which is disposed at a front part of the vehicle and mainly controls temperature of air blown into a front part of the passenger compartment, and a rear air conditioning unit, which is disposed at a rear part of the vehicle and mainly controls temperature of air blown into a rear part of the passenger compartment;
   the front air conditioning unit has a diffusion air outlet for discharging air, the diffusion air outlet being disposed at least in a whole upper surface of a front instrument panel;
   the rear air conditioning unit has a roof air outlet for discharging air, the roof air outlet being disposed at least at a rear roof; and
   each discharging opening is disposed inside a passenger door so as to correspond to a hip position of a passenger sitting on the corresponding seat.

2. A vehicle air conditioning apparatus according to claim 1 further comprising an air blower for discharging air from the discharging openings.

3. A vehicle air conditioning apparatus according to claim 1 further comprising a non-return valve for preventing outside air from drawing into the passenger compartment through the discharging openings.

4. A vehicle air conditioning apparatus according to claim 1, wherein the discharging openings are communicated with the passenger compartment through micro air vent holes formed on a surface of a passenger door.

5. A vehicle air conditioning apparatus according to claim 1, further comprising a plurality of air blowers respectively provided for the discharging openings for discharging air from the discharging openings.

* * * * *